United States Patent
Ichikawa et al.

(10) Patent No.: US 10,783,882 B2
(45) Date of Patent: Sep. 22, 2020

(54) ACOUSTIC CHANGE DETECTION FOR ROBUST AUTOMATIC SPEECH RECOGNITION BASED ON A VARIANCE BETWEEN DISTANCE DEPENDENT GMM MODELS

(71) Applicant: INTERNATIONAL BUSINESS MACHINES CORPORATION, Armonk, NY (US)

(72) Inventors: Osamu Ichikawa, Yokohama (JP); Gakuto Kurata, Tokyo (JP); Takashi Fukuda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 15/861,037

(22) Filed: Jan. 3, 2018

(65) Prior Publication Data
US 2019/0206394 A1    Jul. 4, 2019

(51) Int. Cl.
*H04M 1/725* (2006.01)
*G10L 15/20* (2006.01)
(Continued)

(52) U.S. Cl.
CPC .............. *G10L 15/20* (2013.01); *G10L 15/02* (2013.01); *G10L 15/063* (2013.01);
(Continued)

(58) Field of Classification Search
CPC .. H04M 1/72572; G10L 15/063; G10L 15/02; G10L 15/20
(Continued)

(56) References Cited

U.S. PATENT DOCUMENTS 8,140,325 B2  3/2012  Kanevsky et al.
2010/0057462 A1*  3/2010  Herbig .................... G10L 15/02
                                                              704/243
(Continued)

FOREIGN PATENT DOCUMENTS

WO    2016/071781 A1    5/2016

OTHER PUBLICATIONS

Ichikawa, O. et al., "Speech corpus recycling for acoustic cross-domain environments for automatic speech recognition" Acoust. Sci. & Tech. (Mar. 2016) pp. 55-65, vol. 37, No. 2.

*Primary Examiner* — Farzad Kazeminezhad
(74) *Attorney, Agent, or Firm* — Tutunjian & Bitetto, P.C.; Vazken Alexanian

(57) ABSTRACT

Acoustic change is detected by a method including preparing a first Gaussian Mixture Model (GMM) trained with first audio data of first speech sound from a speaker at a first distance from an audio interface and a second GMM generated from the first GMM using second audio data of second speech sound from the speaker at a second distance from the audio interface; calculating a first output of the first GMM and a second output of the second GMM by inputting obtained third audio data into the first GMM and the second GMM; and transmitting a notification in response to determining at least that a difference between the first output and the second output exceeds a threshold. Each Gaussian distribution of the second GMM has a mean obtained by shifting a mean of a corresponding Gaussian distribution of the first GMM by a common channel bias.

20 Claims, 8 Drawing Sheets

(51) Int. Cl.
*G10L 15/02* (2006.01)
*G10L 15/08* (2006.01)
*G10L 15/06* (2013.01)
*G10L 15/07* (2013.01)
*G10L 25/51* (2013.01)
*G10L 25/24* (2013.01)
*G10L 25/27* (2013.01)

(52) U.S. Cl.
CPC ............ *G10L 15/075* (2013.01); *G10L 25/51* (2013.01); *G10L 25/24* (2013.01); *G10L 25/27* (2013.01)

(58) Field of Classification Search
USPC ........................................ 704/235, 243, 226
See application file for complete search history.

(56) References Cited

U.S. PATENT DOCUMENTS

| | | |
|---|---|---|
| 2014/0025374 A1 | 1/2014 | Lou |
| 2014/0039888 A1* | 2/2014 | Taubman .......... H04M 1/72572 704/235 |
| 2014/0337026 A1* | 11/2014 | Ichikawa .............. G10L 15/063 704/243 |
| 2015/0058003 A1 | 2/2015 | Mohideen et al. |
| 2016/0203828 A1* | 7/2016 | Gomez ................... G10L 15/20 704/226 |

* cited by examiner

ACOUSTIC CHANGE DETECTION FOR ROBUST AUTOMATIC SPEECH RECOGNITION BASED ON A VARIANCE BETWEEN DISTANCE DEPENDENT GMM MODELS

BACKGROUND

Technical Field

The present invention relates to acoustic change detection for robust automatic speech recognition.

Related Art

Accuracy of automatic speech recognition (or ASR) is degraded when characteristics of the audio data are changed. Such change typically occurs when the distance from a mouth of a speaker to a microphone changes due to a moving speaker.

SUMMARY

According to an aspect of the present invention, provided is a computer-implemented method including preparing a first Gaussian Mixture Model (GMM) trained with first audio data of first speech sound from a speaker at a first distance from an audio interface and a second GMM generated from the first GMM using second audio data of second speech sound from the speaker at a second distance from the audio interface, obtaining third audio data of third speech sound; calculating a first output of the first GMM and a second output of the second GMM by inputting third audio data into the first GMM and the second GMM; and transmitting a notification in response to determining at least that a difference between the first output and the second output exceeds a threshold, wherein each Gaussian distribution of the second GMM has a mean obtained by shifting a mean of a corresponding Gaussian distribution of the first GMM by a common channel bias.

The foregoing aspect may also include an apparatus configured to perform the method, and a computer program product storing instructions embodied on a computer-readable medium or programmable circuitry, that, when executed by a processor or the programmable circuitry, cause the processor or the programmable circuitry to perform the method.

According to another aspect of the present invention, provided is a system including, an apparatus performing the method of the above aspect, and an automatic speech recognition device configured to obtain the third audio data, transcribe the third audio data into text data using at least one speech recognition model, output the text data, and change the at least one speech recognition model in response to receiving the notification of the detection from the apparatus.

The foregoing aspect may also include an apparatus included in the system, a computer-implemented method performed by the system, and a computer program product storing instructions embodied on a computer-readable medium or programmable circuitry, that, when executed by a processor or the programmable circuitry, cause the processor or the programmable circuitry to perform the method. The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

A system of some embodiments of the present invention includes an acoustic change detector and an ASR device. The ASR device may input audio data and transcribe the audio data into text data. The ASR device may store one or more speech recognition models.

The acoustic change detector may detect acoustic change such as a variance of one or more characteristics of the audio data (such as the change of distance from a speaker), and notify the change to the ASR device. The ASR device may change the at least one speech recognition model in response to receiving the notification of the detection of variance. Here, the systems of the embodiments are explained in relation to FIGS. 1-3.

Figure 1:
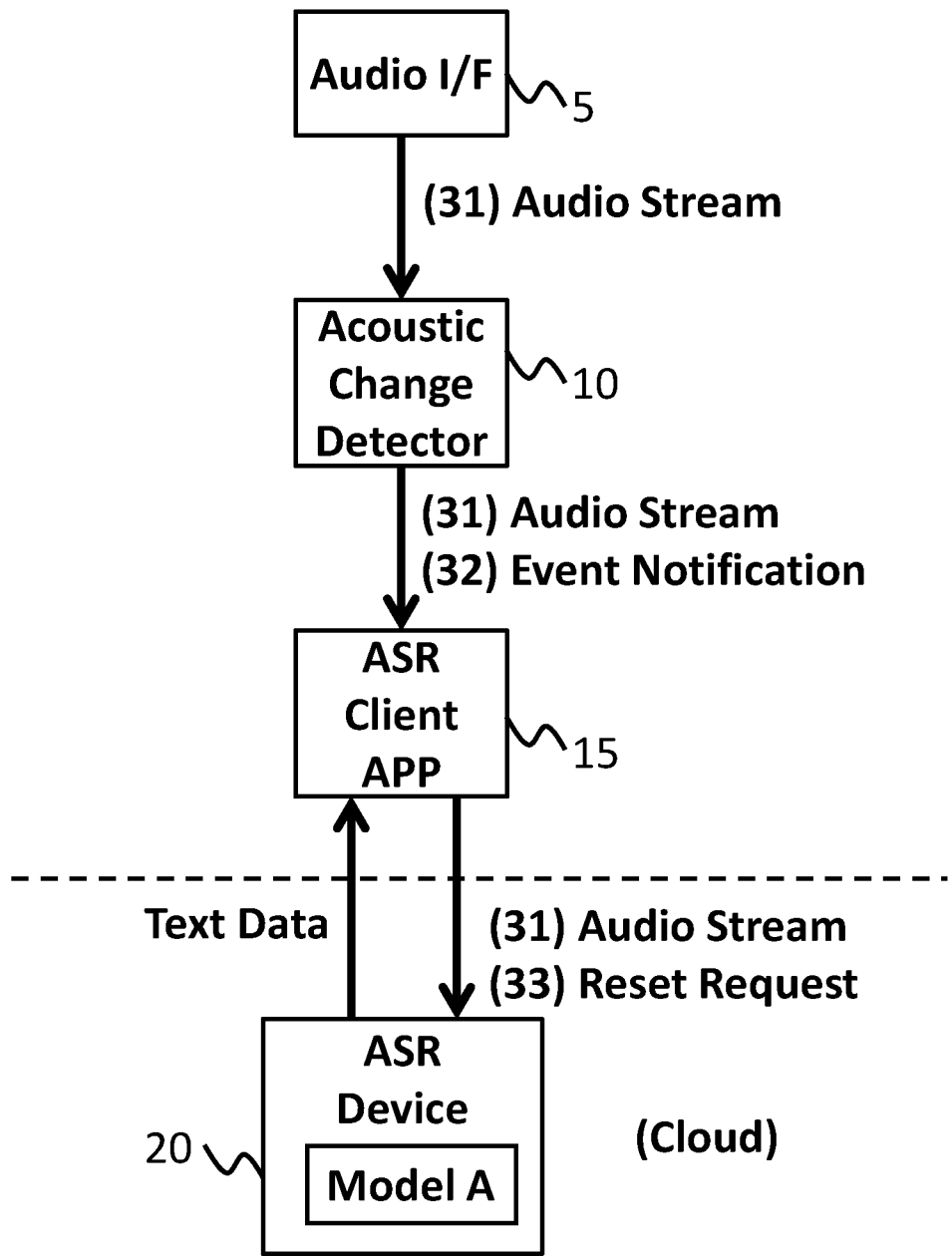
FIG. 1 shows an exemplary configuration of a system 1, according to an embodiment of the present invention.

FIG. 1 shows an exemplary configuration of a system 1, according to an embodiment of the present invention. The system 1 may transcribe audio data into text data using a cloud computing platform. The system 1 includes an audio interface 5, an acoustic change detector 10, an ASR client application 15, and an ASR device 20.

The audio interface 5 outputs an audio stream including audio data of speech sound by a speaker. In an embodiment, the audio interface 5 may be a microphone. The audio interface 5 may provide the acoustic change detector 10 with the audio stream of the speech.

The acoustic change detector 10 (or ACD 10) may obtain (31) the audio stream from the audio interface 5, and provide the ASR client application 15 with the audio stream. The ACD 10 may also provide the ASR client application 15 with an event notification.

The ACD 10 may detect a variance of one or more characteristics of the audio data of the audio stream, as an event. The one or more characteristics of the audio data may include one or more sound transfer characteristics.

In an embodiment, the ACD 10 may detect a change of distance to the audio interface 5 from the speaker, as the event. For example, the ACD 10 may detect an event that the speaker has moved from a relatively far position to a relatively near position, or an event that the speaker has moved from a relatively near position to a relatively far position.

When detecting the event, the ACD 10 may transmit (32) a notification of the event to the ASR Client application 15. In an embodiment, the ACD 10 may transmit the notification of the detection of the variance.

The ASR client application 15 is a client computer of a cloud ASR service. The ASR client application 15 may obtain (31) the audio stream and (32) the notification from the ACD 10. The ASR client application 15 may provide the ASR device 20 with (31) the audio stream.

The ASR client application 15 may send (33) a reset request to the ASR device 20 in response to obtaining the notification from the ACD 10. The ASR client application 15 may receive text data that is transcribed from the audio stream, from the ASR device 20.

The ASR device 20 may be a server computer of a cloud ASR service. The ASR device 20 may obtain the audio stream including the audio data. The ASR device 20 may transcribe the audio data into text data using at least one speech recognition model. The ASR device 20 may output the text data corresponding to the audio stream, and provide the ASR client application 15 with the text data.

The ASR device 20 may change one or more parameters of the speech recognition model in response to receiving the reset request from the ASR client application 15. In an embodiment, the ASR device 20 may reset normalization parameters of the speech recognition model. Thereby, the ASR device 20 may adjust the speech recognition model for the audio stream made at the new distance after receiving the reset request.

Figure 2:
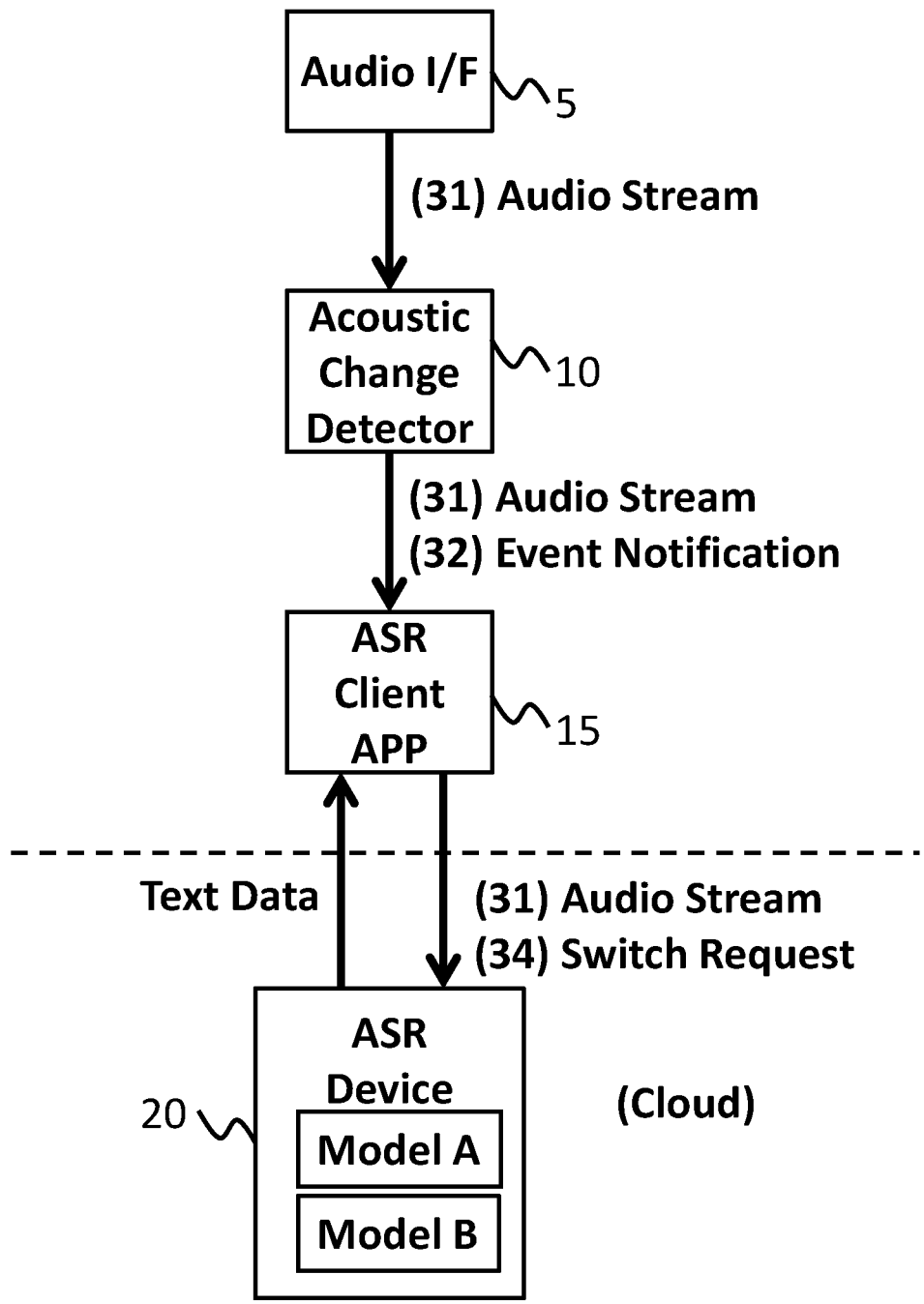
FIG. 2 shows an exemplary configuration of a system 2, according to an embodiment of the present invention.

FIG. 2 shows an exemplary configuration of a system 2, according to an embodiment of the present invention. An audio interface 5, an acoustic change detector 10, an ASR client application 15, and an ASR device 20 in FIG. 2 may correspond to these in FIG. 1. The explanation for elements in FIG. 2 having the same or similar function to corresponding elements in FIG. 1 may be omitted.

In the embodiment of FIG. 2, the ASR client application 15 may send (34) a switch request to the ASR device 20 in response to obtaining the notification from the ACD 10.

The ASR device 20 may store at least two speech recognition models, shown as "Model A" and "Model B." The at least two speech recognition models may be dedicated for different characteristics of the audio data.

In an embodiment, a first speech recognition model (e.g., Model A) is optimized for first speech sound from a speaker at a first distance (e.g., short distance), and a second speech recognition model (e.g., Model B) is optimized for second speech sound from a speaker at a second distance (e.g., long distance). In the embodiment, the ASR device 20 may preliminarily train Model A with audio data made at the first distance, and Model B with audio data made at the second distance.

In another embodiment, the first speech recognition model is optimized for first speech sound from a male speaker, and the second speech recognition model is optimized for second speech sound from a female speaker.

In an embodiment, the ASR device 20 may switch the first speech recognition model to the second speech recognition model in response to receiving the switch request from the ASR client application 15, which sends the switch request in response to receiving a notification from the ACD 10 upon detecting a near-to-far distance change. In the embodiment, the ASR device 20 may transcribe the audio stream by using the first speech recognition model before receiving the switch request, and transcribe the audio stream by using the second speech recognition model after receiving the switch request. In the embodiment, the ASR device 20 may transcribe the audio stream made at the first distance with the first speech recognition model and the audio stream made at the second distance with the second speech recognition model.

In other embodiments, the ASR device may store at least two sessions of one speech recognition model. The sessions may have different normalization parameters. The ASR device 20 may switch a first session of the speech recognition model to a second session of the speech recognition model in response to receiving the switch request from the ASR client application 15. In the embodiment, the ASR device 20 may transcribe the audio stream by using the first session before receiving the switch request, and transcribe the audio stream by using the second session after receiving the switch request. In the embodiment, the ASR device 20 may transcribe the audio stream made at the first distance with the first session and the audio stream made at the second distance with the second session.

Figure 3:
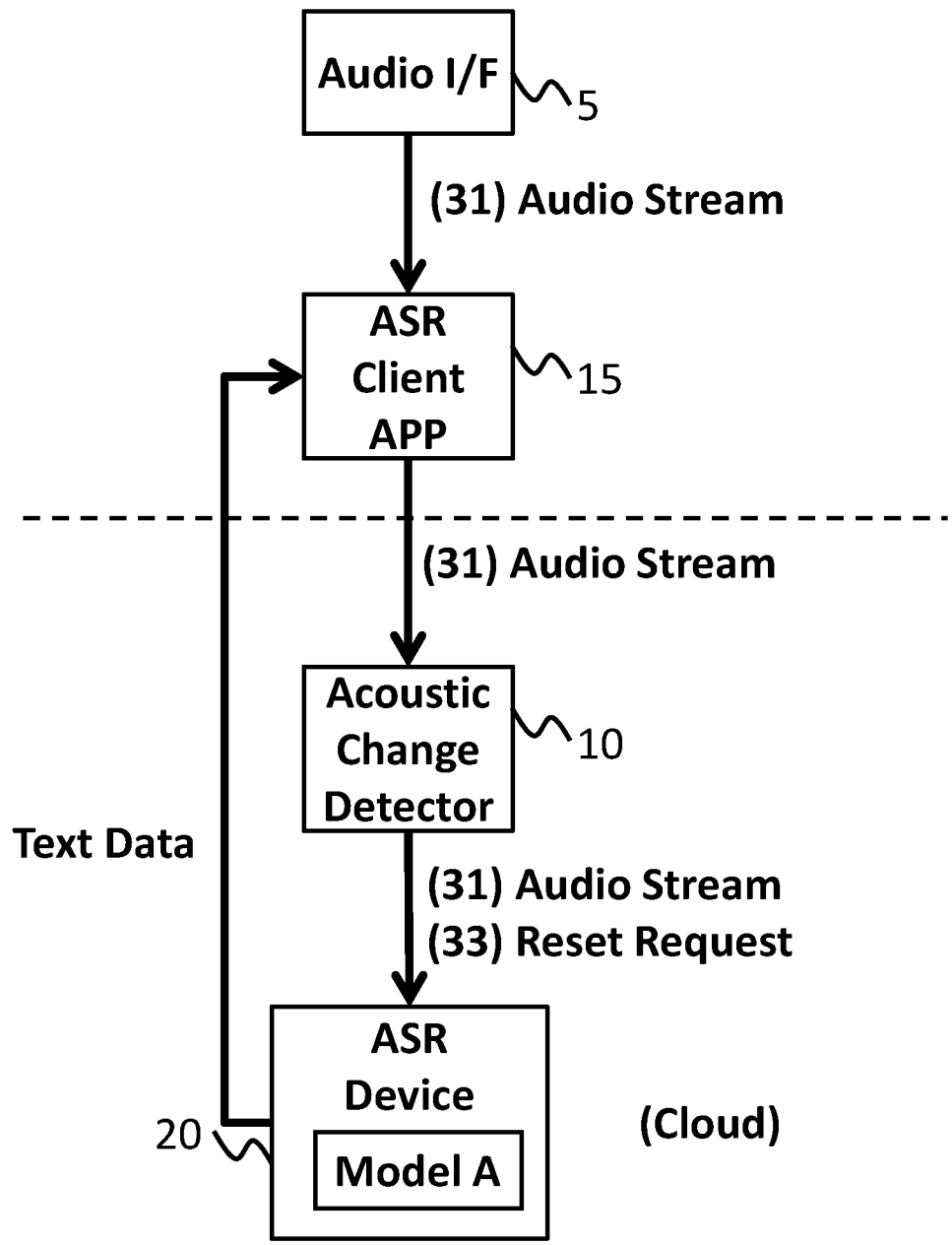
FIG. 3 shows an exemplary configuration of a system 3, according to an embodiment of the present invention.

FIG. 3 shows an exemplary configuration of a system 3, according to an embodiment of the present invention. An audio interface 5, an acoustic change detector 10, an ASR client application 15, and an ASR device 20 in FIG. 3 may correspond to these in FIG. 1. The explanation for elements in FIG. 3 having the same or similar function with the corresponding elements in FIG. 1 may be omitted.

In the embodiment of FIG. 3, the ACD 10 operates as a part of server computers rather than local computers. In the embodiment, the ASR client application 15 may directly receive the audio stream from the audio interface 5, provide the same to the ACD 10, and receive the transcribed text data from the ASR device 20.

In the embodiment, the ACD 10 may receive the audio stream and provide the same to the ASR device 20. In the embodiment, the ACD 10 may send the reset request to the ASR device 20 in response to detecting the variance of the audio stream.

In the embodiments of FIGS. 1-3, the ACD 10 may detect the variance (e.g., change of distance) using a Gaussian Mixture Model (or GMM), but in other embodiments, the ACD 10 may detect the change using a Neural Network or a Boltzmann machine.

Figure 4:
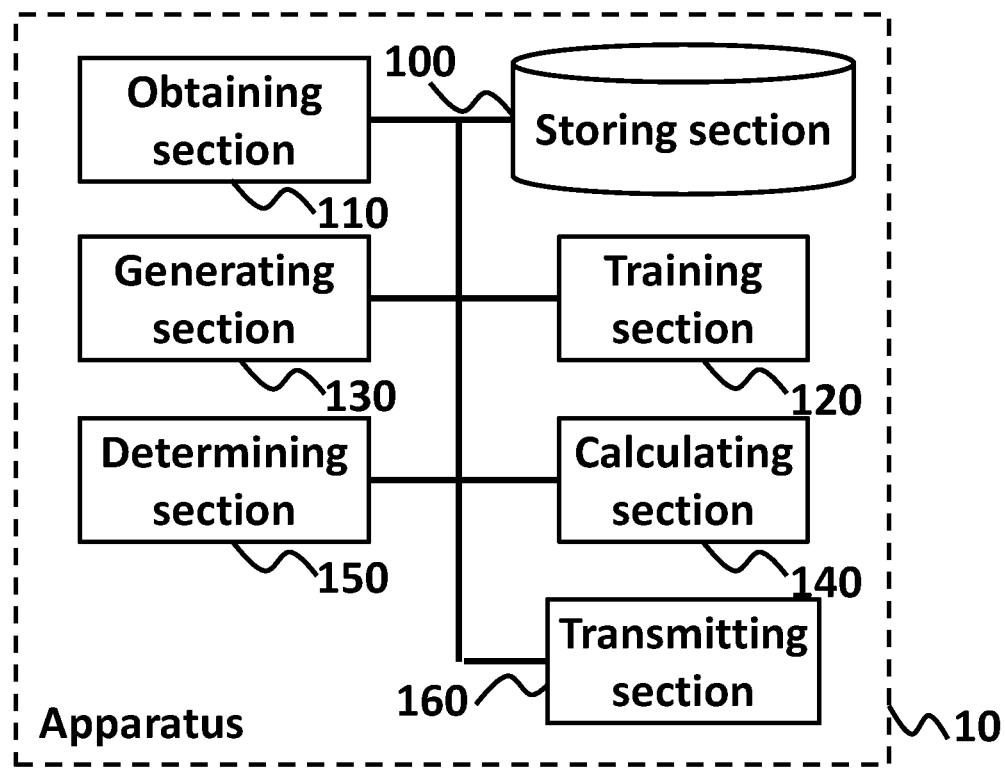
FIG. 4 shows an exemplary configuration of an apparatus 10, according to an embodiment of the present invention.

FIG. 4 shows an exemplary configuration of an apparatus 10, according to an embodiment of the present invention. The ACD 10 explained in relation to FIGS. 1-3 may be implemented by the apparatus 10. The apparatus 10 may detect a variance of one or more characteristics of the audio data and transmit a notification of the detection.

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, an obtaining section 110, a training section 120, a generating section 130, a calculating section 140, a determining section 150, and a transmitting section 160.

The storing section 100 may store information used for the processing that the apparatus 10 performs. The storing section 100 may also store a variety of data/instructions used for operations of the apparatus 10. One or more other elements in the apparatus 10 (e.g., the obtaining section 110, the training section 120, the generating section 130, the calculating section 140, the determining section 150, and the transmitting section 160) may communicate data directly or via the storing section 100, as necessary.

The storing section 100 may be implemented by a volatile or non-volatile memory of the apparatus 10. In some embodiments, the storing section 100 may store processed/non-processed audio data, Gaussian mixture models, and other data related thereto.

The obtaining section 110 may obtain a plurality of audio data having different characteristics from an audio interface, such as the audio interface 5. In an embodiment, the obtaining section 110 may obtain first audio data of first speech sound from a speaker at a first distance from the audio interface.

The obtaining section 110 may also obtain second audio data of second speech sound from the speaker at a second distance from the audio interface. The obtaining section 110 may obtain third audio data of third speech sound from a speaker at any distance from the audio interface.

The first and second audio data may be used for training of Gaussian Mixture Models stored in the apparatus 10. The third audio data may be used for detecting the variance of the audio data. In an embodiment, the obtaining section 110 may process the audio data to obtain cepstrum features of the speech sound of the audio data, or obtain the cepstrum features of the audio data.

The training section 120 may train at least one Gaussian Mixture Model (or GMM). In an embodiment, the training section 120 may train a first GMM with the first audio data.

The generating section 130 may generate at least one GMM using the GMM trained by the training section 120. In an embodiment, the generating section 130 may generate a second GMM from the first GMM using the second audio data. Details of the training of the first GMM and the generation of the second GMM are explained in relation to FIG. 6.

The calculating section 140 may calculate a first output of the first GMM and a second output of the second GMM by inputting third audio data into the first GMM and the second GMM.

The determining section 150 may determine whether to detect the variance of audio data using the first output and the second output from the third audio data. In an embodiment, the determining section 150 may determine whether a difference between the first output and the second output exceeds a threshold.

The transmitting section 160 may transmit a notification in response to the determining section 150 determining that the variance of the audio data is detected. In an embodiment, the transmitting section 160 may transmit the notification in response to the determining section 150 determining that the difference between the first output and the second output exceeds the threshold. The transmitting section 160 may transmit the notification to an ASR client application such as the ASR client application 15 or an ASR device such as the ASR device 20.

The transmitting section 160 may also transmit the audio data that the obtaining section 110 has obtained, to another device such as the ASR client application 15 and/or the ASR device 20. The transmitting section 160 may transmit cepstrum features of the audio data or the audio data as it is (e.g., WAVE format).

Figure 5:
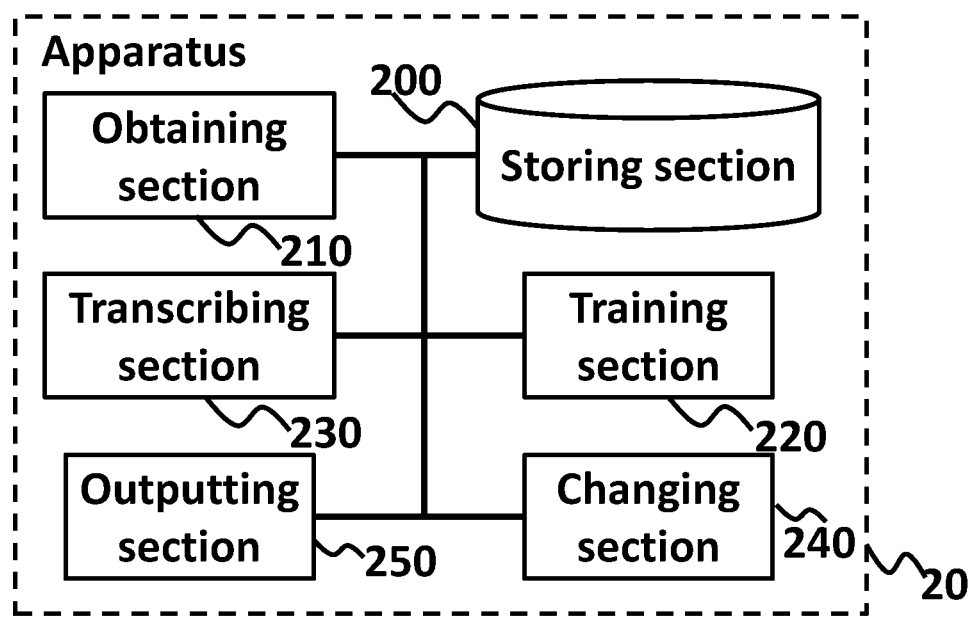
FIG. 5 shows an exemplary configuration of an apparatus 20, according to an embodiment of the present invention.

FIG. 5 shows an exemplary configuration of an apparatus 20, according to an embodiment of the present invention. The ASR device 20 explained in relation to FIGS. 1-3 may be implemented by the apparatus 20. The apparatus 20 may transcribe audio data into text data. The apparatus 20 may be implemented by any known ASR device.

The apparatus 20 may include a processor and/or programmable circuitry. The apparatus 20 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 20 may be regarded as including a storing section 200, an obtaining section 210, a training section 220, a transcribing section 230, a changing section 240, and an outputting section 250.

The storing section 200 may store information used for the processing that the apparatus 20 performs. The storing section 200 may also store a variety of data/instructions used for operations of the apparatus 20. One or more other elements in the apparatus 20 (e.g., the obtaining section 210, the training section 220, the transcribing section 230, the changing section 240, and the outputting section 250) may communicate data directly or via the storing section 200, as necessary.

The storing section 200 may be implemented by a volatile or non-volatile memory of the apparatus 20. In some embodiments, the storing section 200 may store the audio data, the speech recognition model, the text data, and other data related thereto.

The obtaining section 210 may obtain a plurality of audio data having different characteristics from an audio interface such as the audio interface 5. In an embodiment, the obtaining section 210 may obtain audio data of speech sound from a speaker.

In an embodiment, the obtaining section 210 may also obtain training data including one or more sets of audio data and text data transcribed from the audio data.

In an embodiment, the obtaining section 210 may process the audio data to obtain cepstrum features of the speech sound of the audio data, or obtain the cepstrum features of the audio data.

The training section 220 may train at least one speech recognition model with the training data. In an embodiment, the training section 220 may train a plurality of speech recognition models. In the embodiment, the training section 220 may train the first speech recognition model and the second speech recognition model explained in relation to the embodiments of FIG. 2.

In the embodiment, the training section 220 may train the first speech recognition model with the training data including the audio data of speech sound from a speaker at the first distance. The training section 220 may also train the second speech recognition model with the training data including the audio data of speech sound from a speaker at the second distance.

The transcribing section 230 may transcribe the audio data into text data using the at least one speech recognition model trained by the training section 220.

The changing section 240 may change the at least one speech recognition model used by the transcribing section 230, in response to receiving the notification of the detection of variance from the ACD 10 (e.g., the apparatus 10).

In an embodiment, the changing section 240 may reset the normalization parameters of the speech recognition model as explained in the embodiments of FIG. 1. In an embodiment, the changing section 240 may switch the first speech recognition model to the second speech recognition model as explained in the embodiments of FIG. 2. In an embodiment, the changing section 240 may switch a first session of the speech recognition model to a second session of the speech recognition model.

The outputting section 250 may output the text data transcribed from the audio data. In an embodiment, the outputting section 250 may transmit the text data to an ASR client application such as the ASR client application 15.

Figure 6:
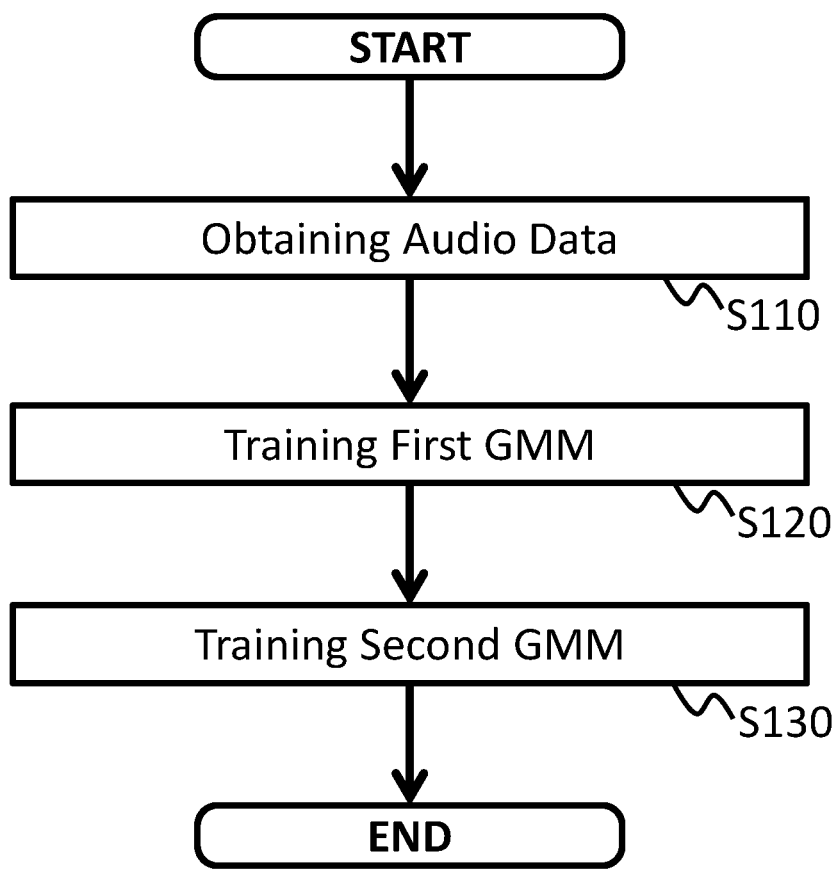
FIG. 6 shows an operational flow of the ACD 10 according to an embodiment of the present invention.

FIG. 6 shows an operational flow of the ACD 10 according to an embodiment of the present invention. The present embodiment describes an example in which the ACD 10, such as the apparatus 10, trains the first GMM and the second GMM by performing operations from S110 to S130, as shown in FIG. 6.

At S110, an obtaining section such as the obtaining section 110 may obtain an audio stream of speech sound for training a plurality of GMMs. In an embodiment, the audio stream may include a plurality of audio data, and each audio data may correspond to each time frame (e.g., 10 ms) in the audio stream. In an embodiment, the audio data may be in the WAVE format.

The obtaining section may obtain different audio streams. In an embodiment, the obtaining section may obtain a first audio stream including a plurality of first audio data and a second audio stream including a plurality of second audio data. In the embodiment, the first audio data is of first speech sound from a speaker at a first distance from the audio interface, and second audio data is of second speech sound from the speaker at a second distance from the audio interface. The speaker of the first speech sound and the speaker of the second speech sound may be the same or different.

The obtaining section may process the first audio data and the second audio data. In an embodiment, the obtaining section may perform discrete Fourier transform (or DFT) for both sets of audio data to get power spectrum features. In the embodiment, the obtaining section may perform Mel-filter and discrete cosine transform (or DCT) on the power spectrum features to get cepstrum features. In another embodiment, the obtaining section may obtain the cepstrum features of both sets of audio data without processing the audio data.

In an embodiment, the obtaining section may divide the plurality of first and second audio data in the first and second audio streams into a speech segment and a non-speech segment. The obtaining section may perform the division by Voice Activity Detection (or VAD). The obtaining section may perform VAD by any known method such as power-based VAD or model-based VAD.

At S120, a training section such as the training section 120 may train a first GMM. The first GMM may input the audio data of input speech sound, and output a likelihood that the input speech sound is made at the first distance. In an embodiment, the first GMM may input the cepstrum features of the input speech sound as the input audio data.

In an embodiment, an output of the i-th GMM may be represented by log likelihood $LL^{*i}(y)$, which is defined by the following formulae (1)-(8).

$$LL^{*i}(y) = \log(p(y)^{*i}), \quad (1)$$

$$p(y)^{*i} = \sum_{k}^{K} \rho(y)_k^{*i} N\left(y; \mu_{y,k}^{*i}, \sum_{y,k}^{*i}\right), \quad (2)$$

$$\mu_{y,k}^{*i} = \mu_{x,k}^{*i} + G(\mu_{x,k}^{*i}, \mu_n), \quad (3)$$

$$G(x, n) = C \log(1 + \exp(C^{-1}(n - x))), \quad (4)$$

$$\sum_{y,k}^{*i} \cong \sum_{x,k}^{*i} + F(\mu_{x,k}^{*i}, \mu_n)^2 \cdot \left(\sum_{n} - \sum_{x,k}^{*i}\right), \quad (5)$$

$$F(x, n)_d = (1 + \exp(x_d - n_d))^{-1}, \quad (6)$$

$$\rho(y)_k^{*i} = \frac{\gamma_k^{*i} \cdot N\left(y; \mu_{y,k}^{*i}, \sum_{y,k}^{*i}\right)}{\sum_{k'} \gamma_{k'}^{*i} \cdot N\left(y; \mu_{y,k'}^{*i}, \sum_{y,k'}^{*i}\right)}, \quad (7)$$

$$N\left(y; \mu_{y,k}, \sum_{y,k}\right) = \frac{1}{(\sqrt{2\pi})^D \sqrt{|\Sigma_{y,k}|}} \exp\left(\sum_{d=0}^{D-1} -\frac{1}{2}(y_d - \mu_{y,k,d})^2 / \sum_{y,k,d}\right), \quad (8)$$

where the matrix C in formula (4) represents a DCT matrix. In the formulae, y is the observation as the cepstrum features of the input speech sound, p(y) is a likelihood that the input speech sound is made at the i-th distance of the i-th model, $\rho(y)_k^{*i}$ is the posterior probability for the k-th Gaussian distribution of i-th model, $\mu_{x,k}^{*i}$ is the mean of the k-th Gaussian distribution of the i-th model, and $\Sigma_{x,k}^{*i}$ is the variance of the k-th Gaussian distribution of the i-th model. $\mu_{y,k}^{*i}$ is the mean of the k-th Gaussian distribution of the i-th model reflecting a noise and $\Sigma_{y,k}^{*i}$ is the variance of the k-th Gaussian distribution of the i-th model reflecting the noise. $\mu_{y,k}^{*i}$ and $\Sigma_{y,k}^{*i}$ are derived from $\mu_{x,k}^{*i}$ and $\Sigma_{x,k}^{*i}$, and a noise mean $\mu_n$ and a noise variance $\Sigma_n$, as shown in the formulae (3) and (5). $\mu_n$ and $\Sigma_n$ may be determined from a non-speech segment of the audio stream. $N(y; \mu_{y,k}^{*i}, \Sigma_{y,k}^{*i})$ represents a presence of y in a k-th Gaussian distribution of the i-th model, $\gamma_k^{*i}$ is the prior probability for the k-th Gaussian distribution of the i-th model, D is the number of dimensions of the cepstrum features, such as 13, d is each dimension of D dimensions of the cepstrum features, and K is the number of Gaussian distributions, such as 256.

In an embodiment, the training section may perform the training by determining $\mu_{x,k}^{*i}$ and $\Sigma_{x,k}^{*i}$ for K Gaussian distributions of the first model (e.g., i=1) at S120 with the first audio data in the audio stream.

In an embodiment, the training section may use the first audio data of the speech segment for determining $\mu_{x,k}^{1}$ and $\Sigma_{x,k}^{1}$ of the first GMM, and use the first audio data of the non-speech segment for determining $\mu_n$ and $\Sigma_n$. In an embodiment, the training section may determine $\mu_n$ and $\Sigma_n$ by using Expectation Maximization (EM) algorithm.

At 130, the training section may generate a second GMM. The second GMM may input audio data of input speech sound, and output likelihood that the input speech sound is made at the second distance. In an embodiment, the second GMM may input the cepstrum features of the input speech sound as the input audio data.

In an embodiment, the first distance may be shorter than the second distance. Thereby, the accuracy of the first GMM may be higher than the second GMM after earlier iterations of training.

The training section may perform the generation of the second GMM by shifting a mean of each Gaussian distribution of the first GMM by a common channel bias to obtain a mean of a corresponding Gaussian distribution of the second GMM. The common channel bias is a channel bias that is common among K Gaussian distributions of the second GMM. In an embodiment, the Gaussian distributions of the first GMM and the Gaussian distributions of the second GMM at least partially share variances and posterior probabilities. In the embodiment, $\mu^{*2}_{x,k}$ is equal to $\mu^{*1}_{x,k}+c$ where c represents the channel bias common for all $k \in K$ while $\Sigma^{*1}_{x,k}$ is equal to $\Sigma^{*2}_{x,k}$.

Methods for calculating the common channel bias c are described in Ichikawa et al. (2016) "Speech corpus recycling for acoustic cross-domain environments for automatic speech recognition" *The Acoustical Science and Technology*, Vol. 37 (2016) No. 2 P. 55-65. In an embodiment, the training section may set the common channel bias c so as to minimize the auxiliary function Q shown in the following formulae (9)-(11) and the formulae (3)-(8). The common channel bias c may be set by utilizing the expectation maximization (EM) algorithm. In an embodiment, the training section may use the second audio data of the speech segment for determining the common channel bias c.

$$Q = E\left[\sum_{k}^{K} \rho(y)_k^{*2} \cdot \left\{\sum_{d=0}^{D-1} \frac{(y_d - \mu^{*2}_{y,k,d})^2}{\sum^{*2}_{y,k,d}} + \log|\sum^{*2}_{y,k}|\right\}\right], \quad (9)$$

$$\sum^{*2}_{x,k} = \sum^{*1}_{x,k}, \quad (10)$$

$$\mu^{*2}_{x,k} = \mu^{*1}_{x,k} + c, \quad (11)$$

$$\frac{\partial Q}{\partial c_d} \cong E\left[-2 \cdot \sum_{k}^{K} \rho(y)_k^{*2} \cdot (y_d - \mu^{*2}_{y,k,d} - c_d) / \sum^{*2}_{y,k,d}\right] = 0, \quad (12)$$

$$c_d = \frac{E\left[\sum_{k}^{K} \rho(y)_k^{*2} \cdot (y_d - \mu^{*2}_{y,k,d}) / \sum^{*2}_{y,k,d}\right]}{E\left[\sum_{k}^{K} \rho(y)_k^{*2} / \sum^{*2}_{y,k,d}\right]}, \quad (13)$$

By differentiating the formula (9) with reference to $c_d$, and setting the derivate to be zero, formulae (12)-(13) are derived. In an embodiment, the training section may determine $c_d^{(n+1)}$ for d-th component for the common cannel bias c. The indirect derivatives of F can be ignored, and thus the second term in the formula (9) can be also ignored because $\Sigma_{y,k}$ is treated as a constant. The symbol $\delta_{l,d}$ represents the Kronecker delta.

Figure 7:
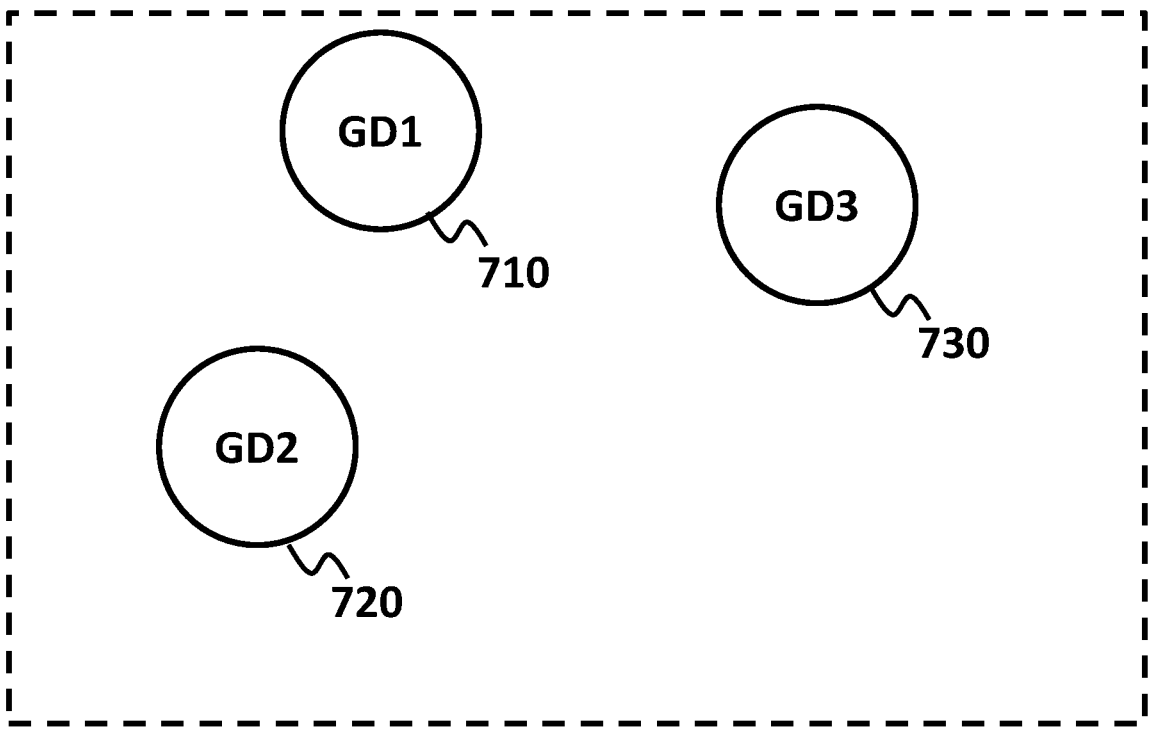
FIG. 7 shows Gaussian distributions of the first GMM according to an embodiment of the present invention.

FIG. 7 shows Gaussian distributions of the first GMM according to an embodiment of the present invention. In the embodiment of FIG. 7, three Gaussian distributions 710, 720, and 730 are described in a D-th dimension cepstrum space. Locations of centers of the Gaussian distributions 710, 720, and 730 correspond to $\mu^{*1}_{x,1}$, $\mu^{*1}_{x,2}$, and $\mu^{*1}_{x,3}$. Sizes of the Gaussian distributions 710, 720, and 730 correspond to $\Sigma^{*1}_{x,1}$, $\Sigma^{*1}_{x,2}$, and $\Sigma^{*1}_{x,3}$.

Figure 8:
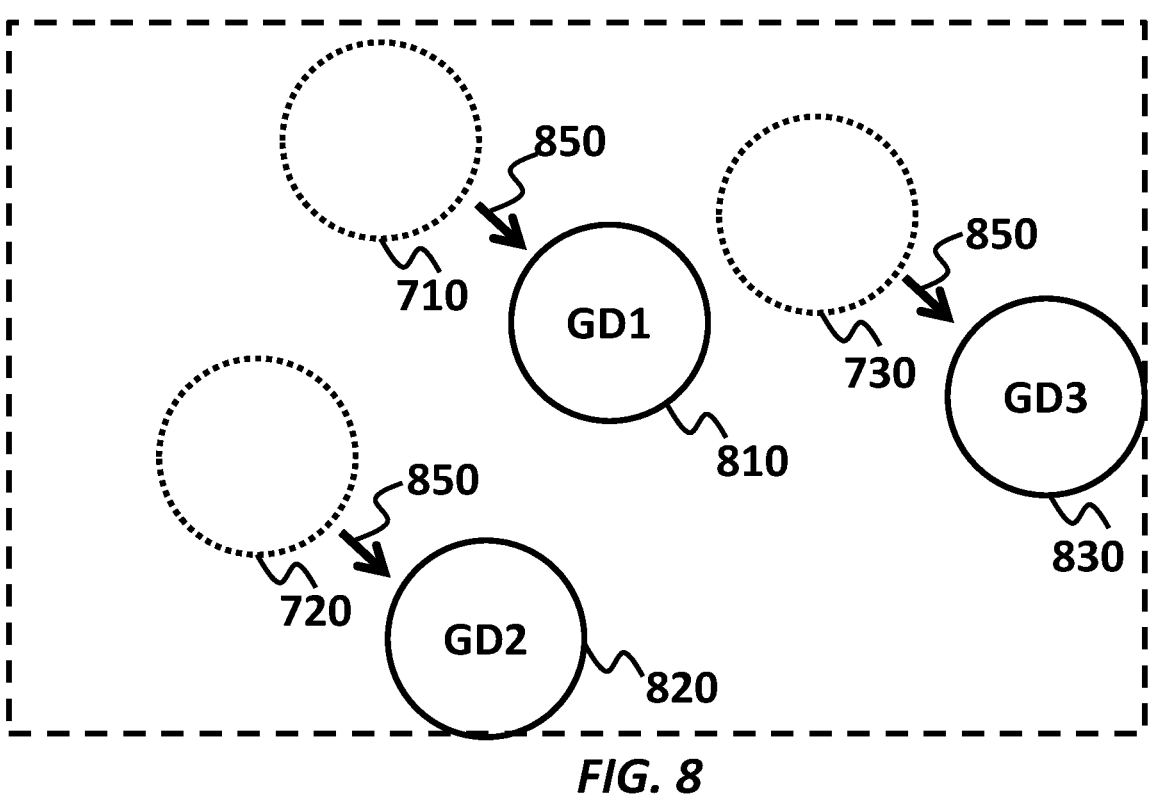
FIG. 8 shows Gaussian distributions of the second GMM according to an embodiment of the present invention.

FIG. 8 shows Gaussian distributions of the second GMM according to an embodiment of the present invention. In the embodiment of FIG. 8, three Gaussian distributions 810, 820, and 830 are described in the D-th dimension cepstrum space. Locations of centers of the Gaussian distributions 810, 820, and 830 correspond to $\mu^{*2}_{x,1}$, $\mu^{*2}_{x,2}$, and $\mu^{*2}_{x,3}$, which are shifted by a common channel bias 850 (shown by an arrow) from 710, 720, and 730. Size of the Gaussian distributions 810, 820, and 830 correspond to $\Sigma^{*2}_{x,1}$, $\Sigma^{*2}_{x,2}$, and $\Sigma^{*2}_{x,3}$ and are the same as $\Sigma^{*1}_{x,1}$, $\Sigma^{*1}_{x,2}$, and $\Sigma^{*1}_{x,3}$.

If training the first GMM and the second GMM independently, the GMMs may be influenced by variability of the audio data for training (e.g., different noise). And, the locations of Gaussian distributions 810, 820, and 830 would substantially be irrelevant to those of Gaussian distributions 710, 720, and 730. According to the embodiments, the first GMM and the second GMM may share substantially the same properties except for the influence of a variance of one or more characteristics (e.g., distance to the speaker). Thereby, the GMMs may exclude the influence of variability of the audio data according to the embodiments of the present invention.

Figure 9:
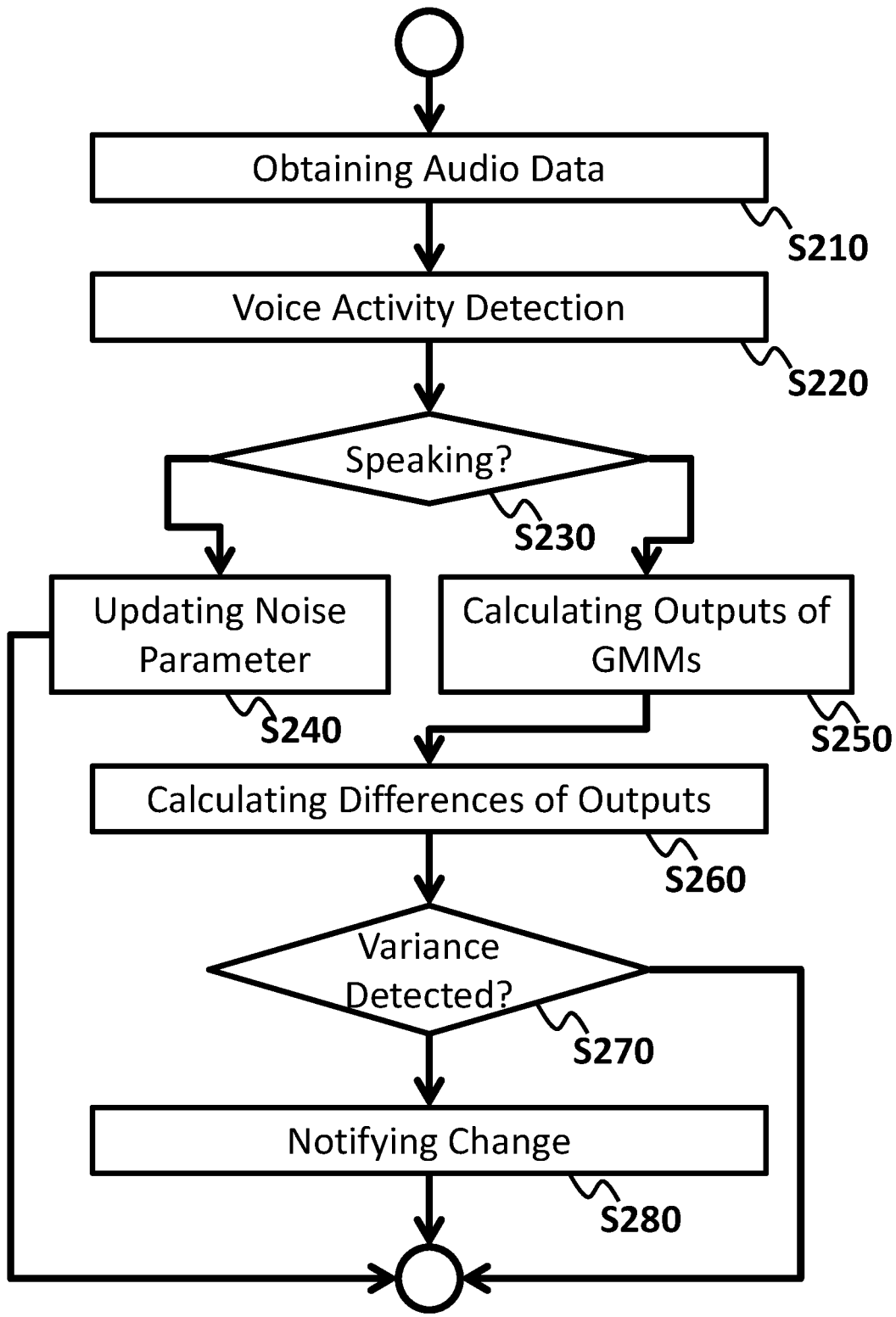
FIG. 9 shows another operational flow of the ACD 10 according to an embodiment of the present invention.

FIG. 9 shows another operational flow of the ACD 10 according to an embodiment of the present invention. The present embodiment describes an example in which the ACD 10, such as the apparatus 10, inputs the audio data and detects a variance of one or more characteristics of the audio data, by performing operations from S210 to S280, as shown in FIG. 9.

The apparatus may perform the operations of FIG. 9 after performing at least some of the operations of FIG. 6. The apparatus may continuously input audio data of an audio stream, buffer the audio data over a certain period, and continuously detect a variance of the audio data buffered during the certain period.

At S210, an obtaining section, such as the obtaining section 110, may obtain the audio data of speech sound for detecting variance of one or more characteristics of the audio data. In an embodiment, the obtaining section may obtain audio data (which may hereinafter be referred to as "target audio data") of speech sound (which may hereinafter be referred to as "target speech sound") from a speaker at an unknown distance from the audio interface.

In an embodiment, the target audio data may be in the WAVE format. In an embodiment, the target audio data may correspond to one time frame (e.g., 10 ms).

The obtaining section may process the target audio data. In an embodiment, the obtaining section may perform DFT for the target audio data to get power spectrum features. In the embodiment, the obtaining section may perform Mel-filter and DCT on the power spectrum features of the target audio data to get cepstrum features. In an embodiment, the obtaining section may obtain the cepstrum features of the target audio data without processing the audio data.

At S220, the obtaining section may determine whether the target audio data corresponds to a speech segment or a non-speech segment. In an embodiment, the obtaining section may perform VAD to find the beginning of a speech segment from the audio stream. The obtaining section may perform VAD by any known method such as power-based VAD or model-based VAD. The obtaining section may determine whether the target audio data corresponds to a speech segment or a non-speech segment.

At S230, if determining that the target audio data is the speech segment at S220, then the obtaining section may proceed with an operation of S250. If determining that the target audio data is the non-speech segment at S220, then the obtaining section may proceed with an operation of S240.

At S240, a calculating section, such as the calculating section 140, may update noise parameters using the target audio data, which is determined as the non-speech segment. In an embodiment, the calculating section may determine a noise mean $\mu_n$ and a noise variance $\Sigma_n$ from the cepstrum features of the target audio data. The calculating section may use a plurality of the target audio data in the non-speech segment for determining the noise parameters.

At S250, the calculating section may calculate a first output of the first GMM and a second output of the second GMM by inputting the cepstrum features of the target audio data into the first GMM and the second GMM.

In an embodiment, the calculating section may calculate $LL^{*i}(y)$ for i=1 and i=2 as defined in the formulae (1)-(8) by inputting the cepstrum features y of the target audio data, and using the most recently updated noise mean $\mu_n$ and noise variance $\Sigma_n$.

In another embodiment, the calculating section may input one or more lower dimensions among full dimensions of the cepstrum features into the first GMM and/or the second GMM. In the embodiment, the calculating section may calculate $LL^{*i}(y)$ by using $N°(y; \mu_{y,k}, \Sigma_{y,k})$ defined by the following formula (8)' instead of $N(y; \mu_{y,k}, \Sigma_{y,k})$ defined by the formula (8).

$$N°\left(y; \mu_{y,k}, \sum_{y,k}\right) = \frac{1}{\left(\sqrt{2\pi}\right)^{D'} \sqrt{|\sum_{y,k}|}} \exp\left(\sum_{d=1}^{D'-1} -\frac{1}{2}(y_d - \mu_{y,k,d})^2 / \sum_{y,k,d}\right), \quad (8)'$$

where D' is smaller than D, such as 4. Thereby, the calculating section may calculate outputs of the GMMs using only lower (D'−1) dimensions among full D dimensions. In the embodiment, the calculating section may not use the 0-th dimension (i.e., d=0), because the 0-th dimension represents only power. Thereby, the outputs of the GMMs may tend to be more distance specific.

In an embodiment, the GMMs may share posterior probabilities. In the embodiment, the calculating section may replace one posterior probability of the Gaussian distributions of the one of the first GMM and the second GMM with a corresponding posterior probability of the other of the first GMM and the second GMM in response to determining that the corresponding posterior probability of the other of the first GMM and the second GMM is larger, by a predetermined degree, than the one posterior probability of the Gaussian distributions of the one of the first GMM and the second GMM. For example, if $\rho(y)^{*1}_k < \rho(y)^{*2}_k$, then the calculating section may calculate $p(y)^{*1}$ by calculating $\Sigma_k^K \rho(y)^{*2}_k N(y; \mu^{*1}_{y,k}, \Sigma^{*1}_{y,k})$ instead of $\Sigma_k^K \rho(y)^{*1}_k N(y; \mu^{*1}_{y,k}, \Sigma^{*1}_{y,k})$. And if $\rho(y)^{*1}_k > \rho(y)^{*2}_k$, then the calculating section may calculate $p(y)^{*2}$ by calculating $\Sigma_k^K \rho(y)^{*1}_k N(y; \mu^{*2}_{y,k}, \Sigma^{*2}_{y,k})$ instead of $\Sigma_k^K \rho(y)^{*2}_k N(y; \mu^{*2}_{y,k}, \Sigma^{*2}_{y,k})$.

At S260, the calculating section may calculate a difference between the outputs of the first GMM and the second GMM. In an embodiment, the calculating section may obtain $LL^{*i}(y)$ for a plurality of time frames in the speech segment (e.g., the beginning of the speech segment) and average them over the frames.

In an embodiment, the calculating section may calculate LL_1−LL_2 by calculating the following formula (14).

$$LL\_1 - LL\_2 = \frac{1}{M} \sum_{t=t'}^{t'+M} (LL^{*1}(y(t)) - LL^{*2}(y(t))), \quad (14)$$

where t' is the starting frame index of the speech segment, M is the number of frames to be averaged, and may be selected from 25-100, depending on the available data in the buffer.

At S270, a determining section, such as the determining section 150, may detect a variance of one or more characteristics of the audio data using the difference calculated at S260. The determining section may determine whether the difference between the first output and the second output exceeds a threshold. The determining section may further determine whether the most recent difference exceeded the threshold.

In an embodiment, the determining section may detect the variance according to the following algorithm:

Diff_LL = LL_1−LL_2,
- if (Diff_LL > θ) and (previous_report < 0) then
  >> Detect "a variance (up-ward)"
  >> Set previous_report:= 1
- if (Diff_LL < −θ) and (previous_report > 0) then
  >> Detect "a variance (down-ward)"
  >> Set previous_report:= −1,
where θ is a preset threshold.

In another embodiment, the determining section may detect the variance according to the following algorithm:

Diff_LL = LL_1−LL_2,
- if (Diff_LL −(previous_diff_LL) > θ) then
   if (previous_report < θ) then
   >> Detect "a variance (up-ward)"
   >> Set previous_report:= 1
  Set previous_diff:= Diff_LL
- if (Diff_LL −(previous_diff_LL) < −θ) then
   if (previous_report > 0) then
   >> Detect "a variance (down-ward)"
   >> Set previous_report:= −1
  Set previous_diff:= Diff_LL.

In the above algorithms, Diff_LL may be calculated by (LL_1-LL_2)×scale_LL, where scale_LL is larger than 1, such as 10.

If the determining section detects the variance, then the determining section may proceed with an operation of S280.

At S280, a transmitting section, such as the transmitting section 160, may transmit a notification of the variance detected at S270. The transmitting section may transmit the notification to the ASR client application or the ASR device. In an embodiment, if the determining section detects "a variance (up-ward)" at S270, then the transmitting section may transmit a notification indicating that a speaker moves from far to near. If the determining section detects "a variance (down-ward)" at S270, then the transmitting section may transmit a notification indicating that a speaker moves from near-to-far.

As explained above, an ACD implemented by an apparatus, such as the apparatus 10, may detect the variance of one or more characteristics of the audio data (such as change of distance from a speaker), and notify the detection of variance to the ASR device. Thereby, the ASR device may improve accuracy of a transcription of audio data.

In the foregoing explanation, embodiments where the first GMM is prepared for first speech sound made at the first distance from the audio interface and the second GMM is prepared for second speech sound made at the second distance from the audio interface are explained.

In other embodiments, the training section may train the first GMM using first speech sound made by a first gender (e.g., male) and train the second GMM using second speech sound made by a second gender (e.g., female). In these embodiments, the training section may train the first GMM and the second GMM in the same or similar manner explained in relation to S120 of FIG. 6.

In other embodiments, the training section may train the first GMM using telecommunication (e.g., phone) conversation sound made by a calling person and train the second GMM using the telecommunication conversation sound made by a called person. In these embodiments, the training section may train the first GMM and the second GMM in the same or similar manner of training of the first GMM explained in relation to S120 of FIG. 6.

Figure 10:
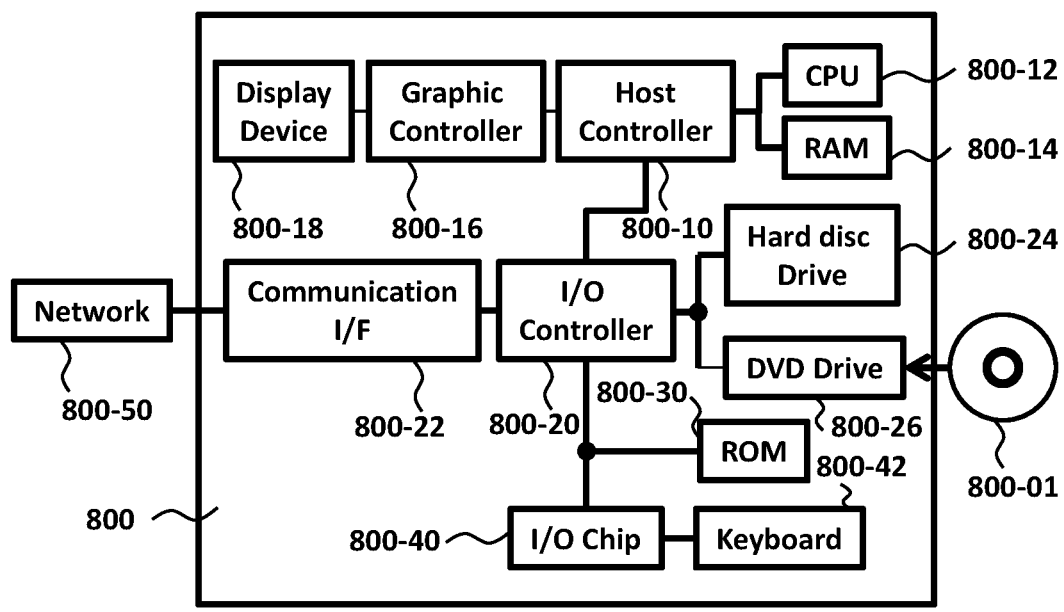
FIG. 10 shows an exemplary hardware configuration of a computer that functions as a system, according to an embodiment of the present invention.

FIG. 10 shows an exemplary hardware configuration of a computer configured for acoustic change detection for robust automatic speech recognition, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention. The apparatus of the embodiments of the present invention may include the computer readable medium and the processor or programmable circuitry operable to execute the instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable to detect a change of variance of characteristics (e.g. distance to a speaker) of audio data and improve a quality of ASR.

What is claimed is:

1. A computer program product including one or more non-transitory computer readable storage media collectively storing program instructions that are executable by a processor or programmable circuitry to cause the processor or programmable circuitry to perform operations comprising:
preparing a first Gaussian Mixture Model (GMM) trained with first audio data of first speech sound from a speaker at a first distance from an audio interface and a second GMM generated from the first GMM using second audio data of second speech sound from the speaker at a second distance from the audio interface;
detecting a change of distance between the speaker and the audio interface by a single acoustic change detector (ACD) in communication with an automatic speech recognition (ASR) client application;
obtaining third audio data of third speech sound;
calculating a first output of the first GMM and a second output of the second GMM by inputting third audio data into the first GMM and the second GMM;
transmitting a notification, the notification related to detection of variance of one or more sound transfer characteristics, in response to determining at least that a difference between the first output and the second output exceeds a threshold,
changing one or more parameters of a first speech recognition model in response to receiving a reset request directly from the ASR client application; and
switching between the first speech recognition model and a second speech recognition model by a switch request sent directly from the ASR client application upon detection of a near-to-far distance change between the speaker and the audio interface based on the variance;
wherein each Gaussian distribution of the second GMM has a mean obtained by shifting a mean of a corresponding Gaussian distribution of the first GMM by a common channel bias.

2. The computer program of claim 1, wherein the Gaussian distributions of the first GMM and the Gaussian distributions of the second GMM at least partially share variances and posterior probabilities.

3. The computer program of claim 2, wherein the first GMM outputs a likelihood that the third speech sound is made at the first distance in response to being input with a cepstrum features of the third speech sound as the third audio data, and
the second GMM outputs likelihood that the third speech sound is made at the second distance in response to being input with cepstrum features of the third speech sound as the third audio data.

4. The computer program of claim 3, wherein the calculating includes
inputting, into the first GMM, one or more lower dimensions among full dimension of the cepstrum features; and
inputting, into the second GMM, one or more lower dimensions among full dimension of the cepstrum features.

5. The computer program of claim 3, wherein the calculating a first output of the first GMM and a second output of the second GMM by inputting third audio data into the first GMM and the second GMM, includes:
calculating an output of one of the first GMM and the second GMM by replacing one posterior probability of the Gaussian distributions of the one of the first GMM and the second GMM with a corresponding posterior probability of the other of the first GMM and the second GMM in response to determining that the corresponding posterior probability of the other of the first GMM and the second GMM is larger, by a predetermined degree, than the one posterior probability of the Gaussian distributions of the one of the first GMM and the second GMM.

6. An apparatus comprising:
a training section that trains a first Gaussian Mixture Model (GMM) with first audio data of first speech sound from a speaker at a first distance from an audio interface;
a generating section that generates a second GMM from the first GMM using second audio data of second speech sound from the speaker at a second distance from the audio interface;
a single acoustic change detector (ACD) that determines a change of distance between the speaker and the audio interface, the single ACD in communication with an automatic speech recognition (ASR) client application;
a calculating section that calculates a first output of the first GMM and a second output of the second GMM by inputting third audio data into the first GMM and the second GMM; and
a transmitting section that transmits a notification, the notification related to detection of variance of one or more sound transfer characteristics, in response to determining that a difference between the first output and the second output exceeds a threshold,
wherein the ASR client application transmits a reset request to change one or more parameters of a first speech recognition model and transmits a switch request to switch between the first speech recognition model and a second speech recognition model upon detection of a near-to-far distance change between the speaker and the audio interface based on the variance;
wherein each Gaussian distribution of the second GMM has a mean obtained by shifting a mean of a corresponding Gaussian distribution of the first GMM by a common channel bias.

7. The apparatus of claim 6, wherein the Gaussian distributions of the first GMM and the Gaussian distributions of the second GMM at least partially share variances and posterior probabilities.

8. The apparatus of claim 7, wherein the first GMM outputs a likelihood that the third speech sound is made at the first distance in response to being input with a cepstrum features of the third speech sound as the third audio data, and
the second GMM outputs likelihood that the third speech sound is made at the second distance in response to being input with cepstrum features of the third speech sound as the third audio data.

9. The apparatus of claim 8, wherein the calculating section inputs, into the first GMM, one or more lower dimensions among full dimension of the cepstrum features;

and inputs, into the second GMM, one or more lower dimensions among full dimension of the cepstrum features.

10. The apparatus of claim 8, wherein the calculating section calculates an output of one of the first GMM and the second GMM by replacing one posterior probability of the Gaussian distributions of the one of the first GMM and the second GMM with a corresponding posterior probability of the other of the first GMM and the second GMM in response to determining that the corresponding posterior probability of the other of the first GMM and the second GMM is larger, by a predetermined degree, than the one posterior probability of the Gaussian distributions of the one of the first GMM and the second GMM.

11. A system comprising,
the apparatus of claim 7; and an automatic speech recognition device configured to:
obtain the third audio data,
transcribe the third audio data into text data using at least one speech recognition model, and
output the text data.

12. A system comprising,
the apparatus of claim 6; and an automatic speech recognition device configured to:
obtain the third audio data,
transcribe the third audio data into text data using at least one speech recognition model, and
output the text data.

13. The system of claim 12, wherein the changing includes changing one or more parameters of the speech recognition model.

14. The system of claim 12, wherein
the automatic speech recognition device is further configured to store at least two sessions of the speech recognition model, and
the changing includes switching a first session of the speech recognition model to a second session of the speech recognition model.

15. The system of claim 12, wherein
the automatic speech recognition device is further configured to store at least two speech recognition models, and
the changing includes switching a first speech recognition model to a second speech recognition model.

16. A computer-implemented method, comprising:
preparing a first Gaussian Mixture Model (GMM) trained with first audio data of first speech sound from a speaker at a first distance from an audio interface and a second GMM generated from the first GMM using second audio data of second speech sound from the speaker at a second distance from the audio interface;
detecting a change of distance between the speaker and the audio interface by a single acoustic change detector (ACD) in communication with an automatic speech recognition (ASR) client application;
obtaining third audio data of third speech sound;
calculating a first output of the first GMM and a second output of the second GMM by inputting third audio data into the first GMM and the second GMM;
transmitting a notification, the notification related to detection of variance of one or more sound transfer characteristics, in response to determining at least that a difference between the first output and the second output exceeds a threshold,
changing one or more parameters of a first speech recognition model in response to receiving a reset request from the ASR client application; and
switching between the first speech recognition model and a second speech recognition model by a switch request sent directly from the ASR client application upon detection of a near-to-far distance change between the speaker and the audio interface based on the variance;
wherein each Gaussian distribution of the second GMM has a mean obtained by shifting a mean of a corresponding Gaussian distribution of the first GMM by a common channel bias.

17. The computer-implemented method of claim 16, wherein the Gaussian distributions of the first GMM and the Gaussian distributions of the second GMM at least partially share variances and posterior probabilities.

18. The computer-implemented method of claim 17, wherein the first GMM outputs a likelihood that the third speech sound is made at the first distance in response to being input with cepstrum features of the third speech sound as the third audio data, and
the second GMM outputs likelihood that the third speech sound is made at the second distance in response to being input with cepstrum features of the third speech sound as the third audio data.

19. The computer-implemented method of claim 18, wherein the calculating includes
inputting, into the first GMM, one or more lower dimensions among full dimension of the cepstrum features; and
inputting, into the second GMM, one or more lower dimensions among full dimension of the cepstrum features.

20. The computer-implemented method of claim 18, wherein the calculating a first output of the first GMM and a second output of the second GMM by inputting third audio data into the first GMM and the second GMM, includes:
calculating an output of one of the first GMM and the second GMM by replacing one posterior probability of the Gaussian distributions of the one of the first GMM and the second GMM with a corresponding posterior probability of the other of the first GMM and the second GMM in response to determining that the corresponding posterior probability of the other of the first GMM and the second GMM is larger, by a predetermined degree, than the one posterior probability of the Gaussian distributions of the one of the one of the first GMM and the second GMM.

* * * * *